Patented May 17, 1949

2,470,190

UNITED STATES PATENT OFFICE 2,470,190

PRODUCTION OF OLEFIN POLYMERS

Louis Schmerling, Riverside, Ill., assignor to Universal Oil Products Company, Chicago, Ill., a corporation of Delaware No Drawing. Application November 29, 1946, Serial No. 713,108

12 Claims. (Cl. 260—683.15)

This invention relates to the production of higher boiling hydrocarbons by the interaction of a monohaloalkane and an olefin in the presence of a metal phosphate catalyst. More particularly, the process relates to the formation of normally liquid olefinic hydrocarbons by reaction of a normally gaseous olefin and a monohaloalkane having preferably at least two carbon atoms per molecule in the presence of a metal phosphate catalyst.

An object of this invention is to provide a method for producing higher boiling hydrocarbons by reacting a monoolefin and a monohaloalkane in the presence of a salt of an acid of phosphorus and a metal.

Another object of this invention is to produce normally liquid hydrocarbons of gasoline boiling range by reacting a normally gaseous monoolefin and a monohaloalkane having at least two carbon atoms per molecule in the presence of a metal phosphate catalyst.

A further object of this invention is to produce higher boiling hydrocarbons by reacting ethylene and a monochloroalkane in the presence of a metal phosphate catalyst.

One specific embodiment of the present invention relates to a process for producing liquid monoolefinic hydrocarbons which comprises converting an olefin into a monohaloalkane and reacting said monohaloalkane and an olefin in the presence of a phosphate of a metal of groups I and II of the periodic table and at a temperature of from about 250° to about 400° C.

Another embodiment of this invention relates to a process for producing mixed polymers from ethylene and a higher boiling monolefin which comprises converting higher boiling monoolefin into a monochloroalkane, and reacting said monochloroalkane and ethylene in the presence of a metal phosphate catalyst at a temperature of from about 250° to about 400° C. and at superatmospheric pressure.

According to the process of my invention an olefinic hydrocarbon and particularly ethylene is cross-polymerized with another olefin by converting said other olefin into a monochloroalkane or monobromoalkane and then contacting said monohaloalkane and the first olefin, usually ethylene, with a metal phospate catalyst of the type hereinafter set forth. This process has an advantage over the process used hitherto wherein attempts have been made to polymerize the olefin mixtures themselves, the chief advantage of my process being that it permits the utilization of ethylene, a monoolefinic hydrocarbon which does not polymerize readily with other olefins to form cross-polymers.

Metal phosphate catalysts utilizable in my process comprise particularly salts and acid salts of phosphorus-containing acids and of metals selected from the members of the group consisting of the alkaline earth metals, the heavy metals of group I and the metals of the right hand column of group II of the periodic table. Alkaline earth salts of phosphorus-containing acids include particularly the acid phosphates of calcium, strontium, and barium. Typical calcium acid phosphates include calcium diphosphate ($CaHPO_4.2H_2O$) and calcium monophosphate ($CaH_4(PO_4)_2.H_2O$).

The preferred phosphates of heavy metals of group I of the periodic table comprise particularly pyrophosphates of copper and silver. Other phosphates which are useful as catalysts in my process comprise the salts of phosphorus-containing acids and of metals selected from the members of the right hand column of group II of the periodic table consisting of magnesium, zinc, cadmium, and mercury. Acid pyrophosphate of magnesium and zinc and cadmium orthophosphate have particularly good polymerizing activities. The different metal phosphate catalysts are thus the salts and acid salts of phosphorus-containing acids including particularly orthophosphoric acid, pyrophosphoric acid, triphosphoric acid, tetraphosphoric acid and heteropolyacids containing phosphorus. The heteropoly acids mentioned above have phosphoric acid radicals and also have in their complex anion an element selected from the members of the left hand columns of groups V and VI of the periodic table and preferably from the elements vanadium, molybdenum, and tungsten. Examples of these heteropoly acids are phosphomolybdic, phosphotungstic, and phosphovanadic acids. Salts of these phosphorous-containing heteropolyacids and the members of groups I and II of the periodic table which are mentioned herein are suitable catalysts for this process, but the phosphorus-containing heteropoly acids themselves are useful polymerizing catalysts particularly when deposited upon substantially inert carriers or supporting materials. These inert carriers or supporting materials which may also be employed with the metal phosphate catalysts herein set forth include granular materials such as silica, diatomaceous earth, alumina, magnesia, silica-alumina composites, raw and acid treated clays, crushed porcelain, etc.

My process is carried out by commingling an olefin and preferably a normally gaseous olefin such as ethylene, propylene, and butylene, with with a monohaloalkane in the presence of a metal phosphate catalyst at a temperature of from about 250° to about 400° C. and preferably at a superatmospheric pressure which is usually from about 15 to about 40 atms., although other pressures are utilizable which seldom exceed about 150 atms. This process may be effected in either batch type treatments or in continuous operation. Continuous operation which is the preferred method of effecting my process is carried out by passing a mixture of a monoolefin, or a hydrocarbon fraction containing monoolefins, and a monohaloalkane in which the halogen is a middle halogen, through a heated reactor containing a metal phosphate catalyst in the form of granules or supported by a granular packing or supporting material as herein set forth. The resultant reaction products are then fractionally distilled or separated by other suitable means to recover unconverted monoolefinic hydrocarbons and monohaloalkanes from higher boiling products comprising essentially monoolefins formed in the process. Thus, when isopropyl chloride and ethylene are passed simultaneously over one or a mixture of metal phosphate catalysts at a temperature of from about 250° to about 400° C., a normally liquid product is obtained containing heptenes, octenes, and other olefins of higher molecular weights. The reaction also produces some ethyl chloride which is suitable for recycling to the reaction in which the fresh mixture of ethylene and isopropyl chloride is introduced.

An alternative procedure consists of cross-polymerizing ethylene and a higher olefin in the presence of a metal phosphate and of an alkyl chloride or hydrogen chloride, these materials being employed in an amount generally from about 1 to about 10% by weight of the reactants being passed over the solid granular catalysts.

The following examples are given of results obtainable by my process although with no intention of limiting unduly the broad scope of the invention.

*Example I*

Ethylene is passed at a rate of 7 liters per hour and isopropyl chloride is charged simultaneously at a rate of 9 grams per hour to a tubular steel reactor containing 50 cc. of 4-10 mesh particles of copper pyrophosphate catalyst, maintained at a temperature of 300° C. and at a pressure of 15 atmospheres. The reaction products yield 10 grams of normally liquid olefinic hydrocarbons and 10 grams of ethyl chloride per hour. Although a relatively large amount of the ethylene which reacts is converted into ethyl chloride, the remainder co-polymerizes with propylene forming a polymer, at least 30% of which boils in the boiling range of octene. These octenes are convertible by hydrogenation into dimethylhexanes and methyl heptanes.

*Example II*

Two moles of ethylene and one mole of secondary butyl chloride are charged per hour through a tubular reactor containing 100 cc. of a granular composite comprising essentially equal parts by weight of magnesium acid orthophosphate and diatomaceous earth at a temperature of 350° C. and a pressure of 40 atmospheres. Besides unconverted ethylene, the reaction products contain ethyl chloride and normally liquid olefins boiling mainly between about 80° and 200° C.

The foregoing specification and examples are not introduced with the intention of limiting unduly the broad scope of the invention.

I claim as my invention:

1. A process for producing a higher boiling hydrocarbon which comprises reacting an olefinic hydrocarbon and a monohaloalkane in the presence of a metal phosphate catalyst at conversion conditions of temperature and pressure.

2. A process for producing a higher boiling hydrocarbon which comprises reacting a monoolefinic hydrocarbon and a monochloralkane in the presence of a metal phosphate catalyst at conversion conditions of temperature and pressure.

3. A process for producing a higher boiling hydrocarbon which comprises reacting a monohaloalkane and an olefinic hydrocarbon in the presence of a metal phosphate catalyst at a temperature of from about 250° to about 400° C.

4. A process for producing a higher boiling hydrocarbon which comprises reacting a monohaloalkane and a monoolefin in the presence of a metal phosphate catalyst at a temperature of from about 250° to about 400° C. at a superatmospheric pressure.

5. A process for producing a monoolefinic hydrocarbon having at least four carbon atoms per molecule which comprises reacting a monoolefin and a monohaloalkane having at least two carbon atoms per molecule in the presence of a metal phosphate catalyst at a temperature of from about 250° to about 400° C.

6. A process for producing a monoolefinic hydrocarbon which comprises reacting a normally gaseous monoolefinic hydrocarbon and a monohaloalkane having at least two carbon atoms per molecule in the presence of a composite of a metal phosphate catalyst and a carrier at a temperature of from about 250° to about 400° C. and at a superatmospheric pressure.

7. A process for producing a monoolefinic hydrocarbon which comprises reacting a normally gaseous monoolefinic hydrocarbon and a monochloroalkane having at least two carbon atoms per molecule in the presence of a composite of a metal phosphate catalyst and a carrier at a temperature of from about 250° to about 400° C. and at a superatmospheric pressure.

8. A process for producing a monoolefinic hydrocarbon which comprises reacting ethylene and a monochloroalkane having at least two carbon atoms per molecule in the presence of a composite of a metal phosphate catalyst and a carrier at a temperature of from about 250° to about 400° C. and at a superatmospheric pressure.

9. A process for producing a higher boiling hydrocarbon which comprises reacting ethylene and isopropyl chloride at a temperature of from about 250° to about 400° C. in the presence of a metal phosphate catalyst.

10. A process for producing a higher boiling hydrocarbon which comprises reacting ethylene and isopropyl chloride at a temperature of from about 250° to about 400° C. in the presence of copper pyrophosphate.

11. A process for producing a higher boiling hydrocarbon which comprises reacting ethylene and secondary butyl chloride at a temperature of from about 250° to about 400° C. in the presence of a metal phosphate catalyst.

12. A process for producing a higher boiling hydrocarbon which comprises reacting ethylene and secondary butyl chloride at a temperature of from about 250° to about 400° C. in the presence of magnesium acid orthophosphate.

LOUIS SCHMERLING.

REFERENCES CITED

The following references are of record in the file of this patent:

UNITED STATES PATENTS

| Number | Name | Date |
|---|---|---|
| 2,189,655 | Ruthruff | Feb. 6, 1940 |
| 2,417,119 | Miller et al. | Mar. 11, 1947 |